Oct. 19, 1943.　　　G. LONG　　　2,332,156
COUPON FEEDER
Filed Dec. 1, 1941　　　8 Sheets-Sheet 2
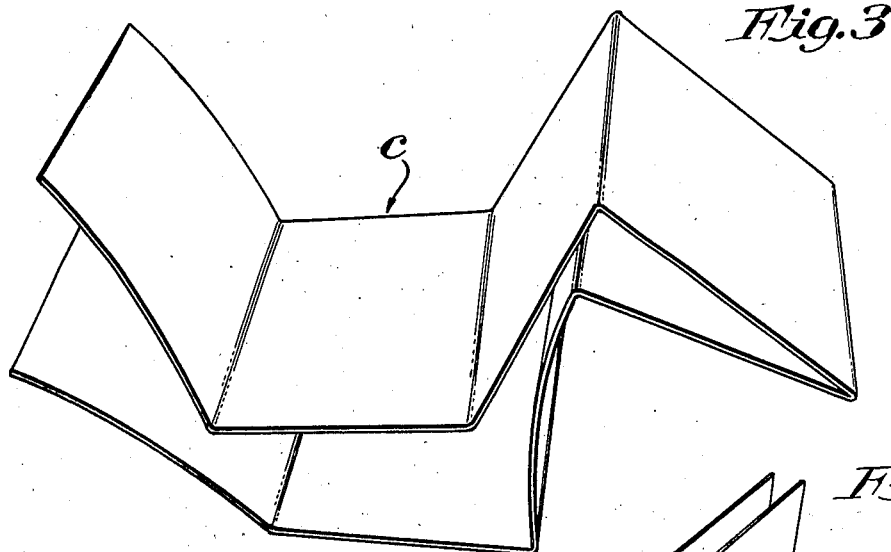
Fig.3
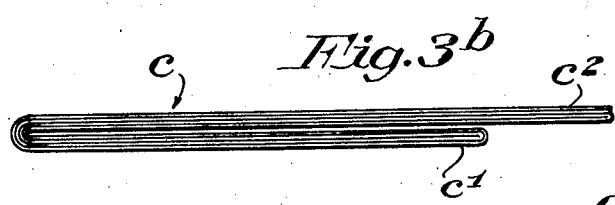
Fig.3$^b$
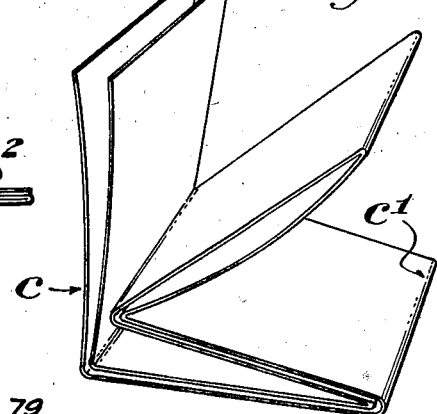
Fig.3$^a$
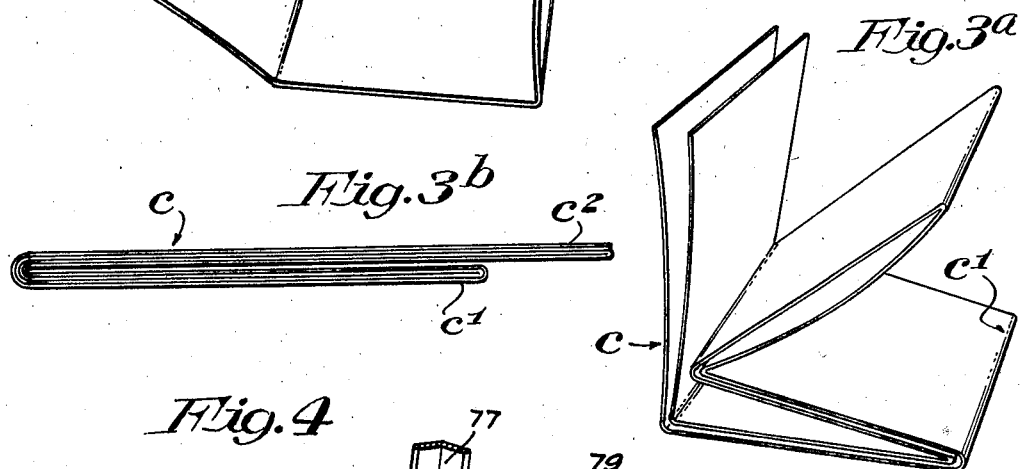
Fig.4
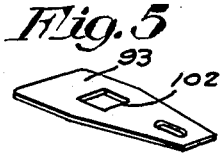
Fig.5
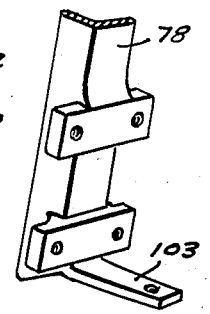
Fig.6
Inventor
George Long
By Arthur P. Uhlie Atty.

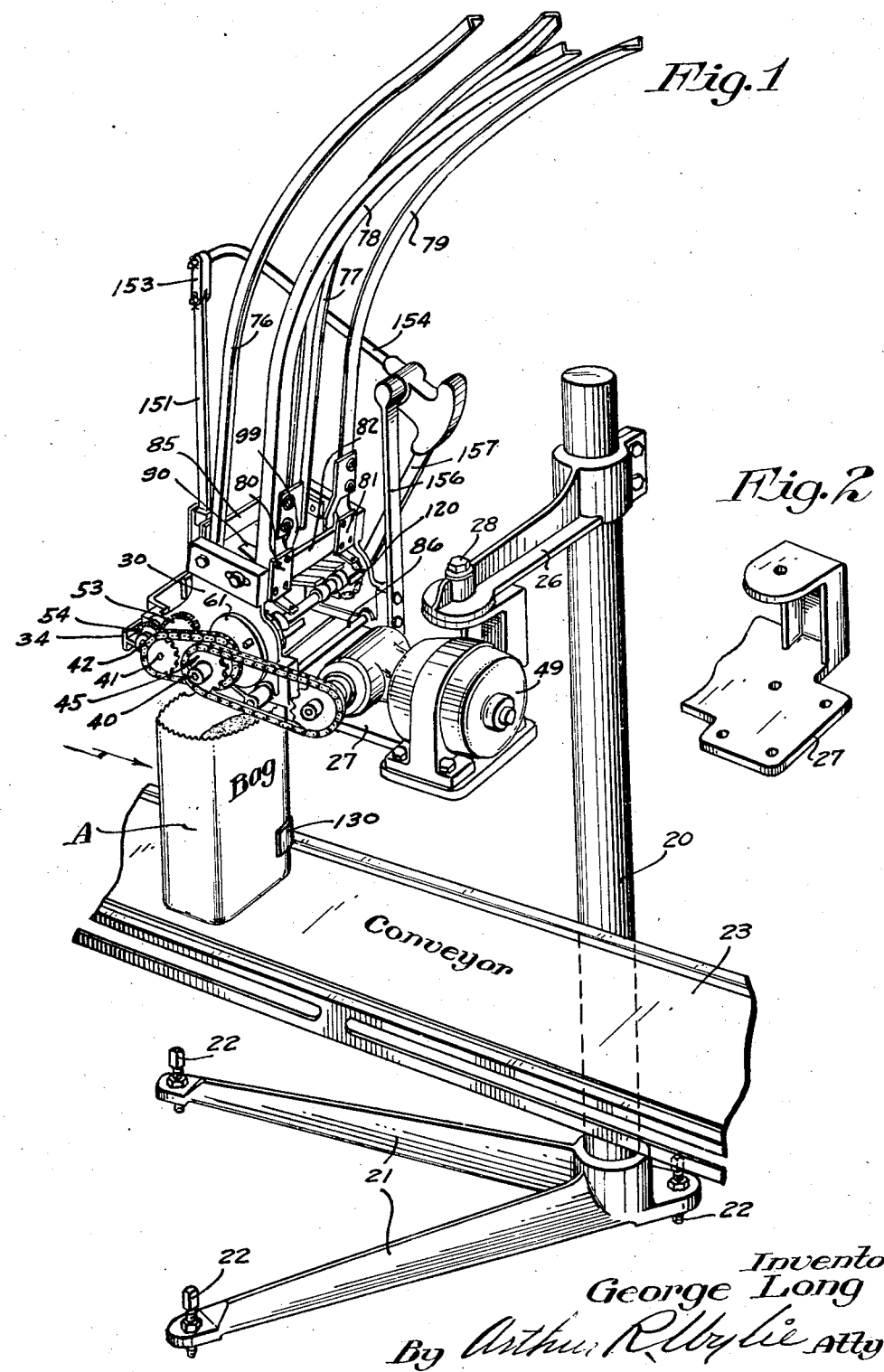

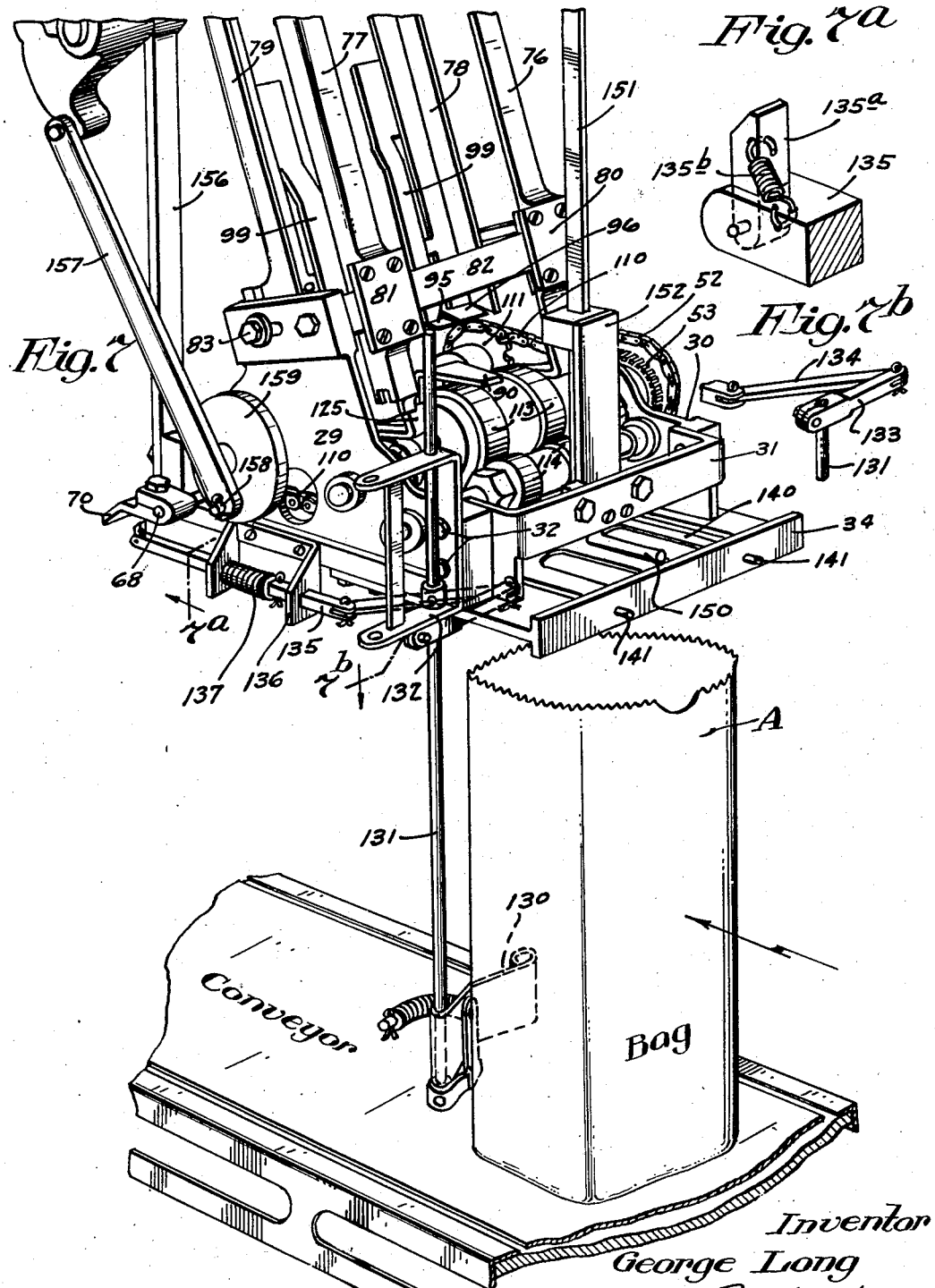

Oct. 19, 1943.  G. LONG  2,332,156
COUPON FEEDER
Filed Dec. 1, 1941  8 Sheets-Sheet 4
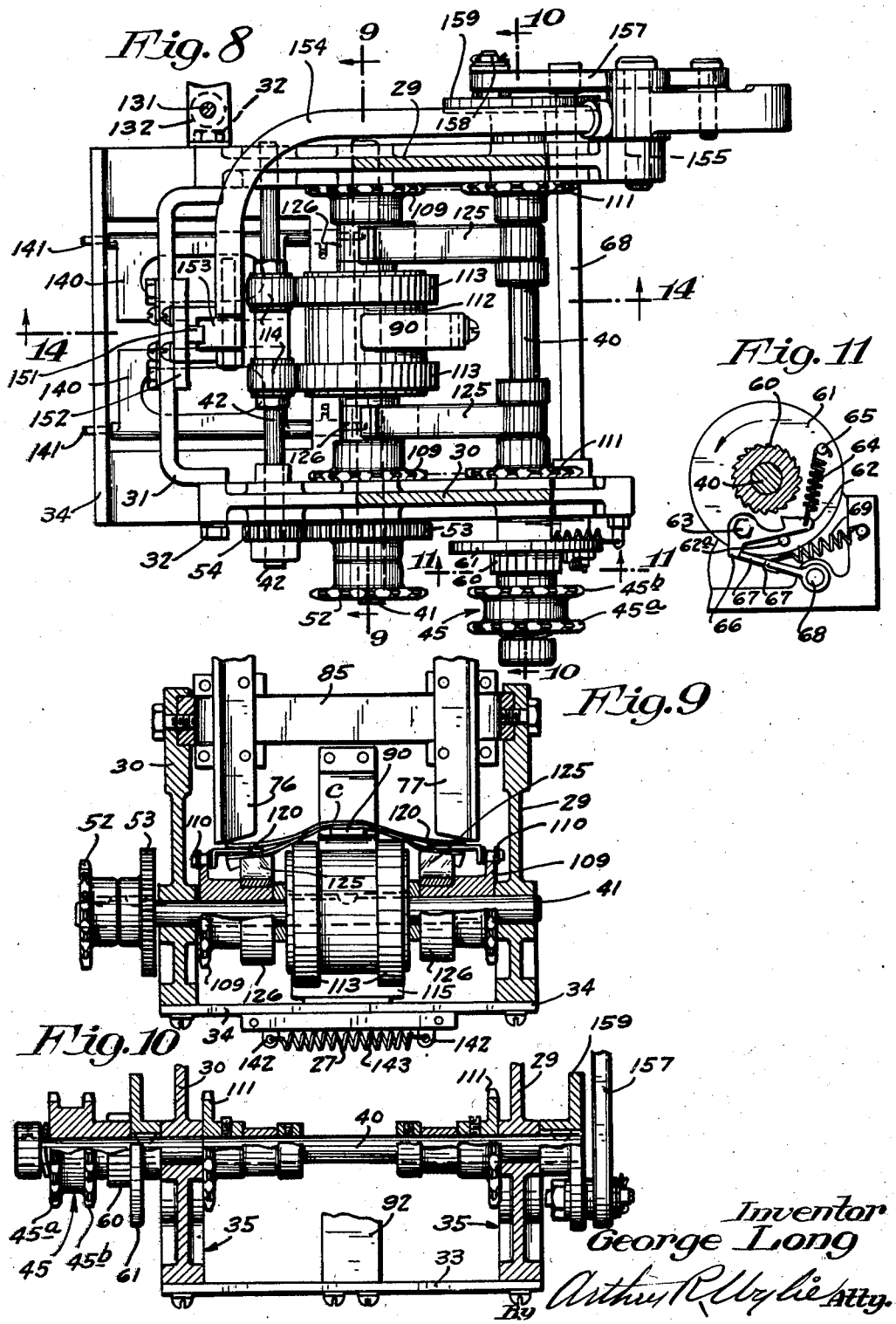
Inventor
George Long
Arthur R. Wylie Atty.

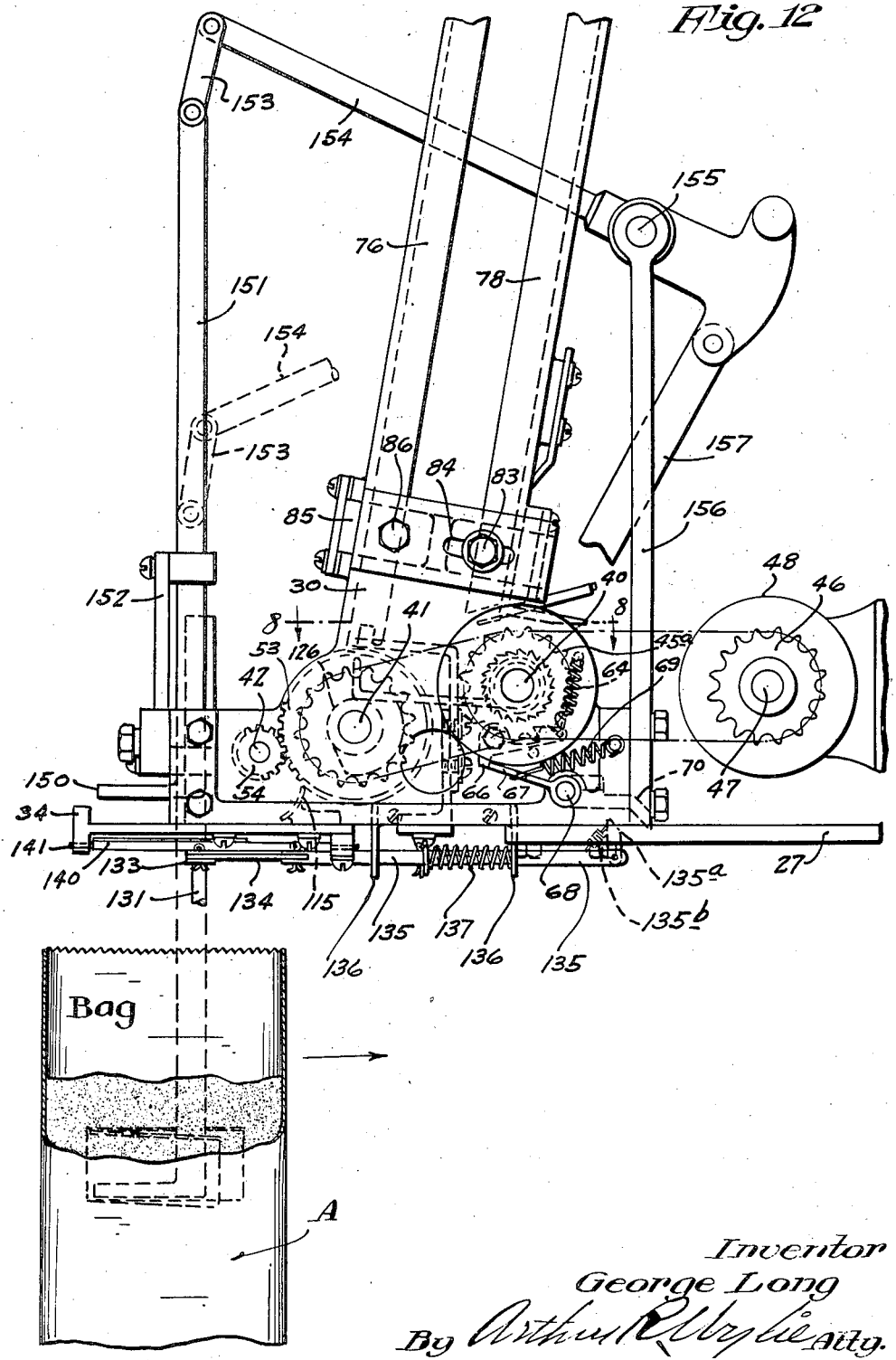

Oct. 19, 1943. G. LONG 2,332,156
COUPON FEEDER
Filed Dec. 1, 1941 8 Sheets-Sheet 6

Inventor
George Long
By Arthur R. Wylie Atty.

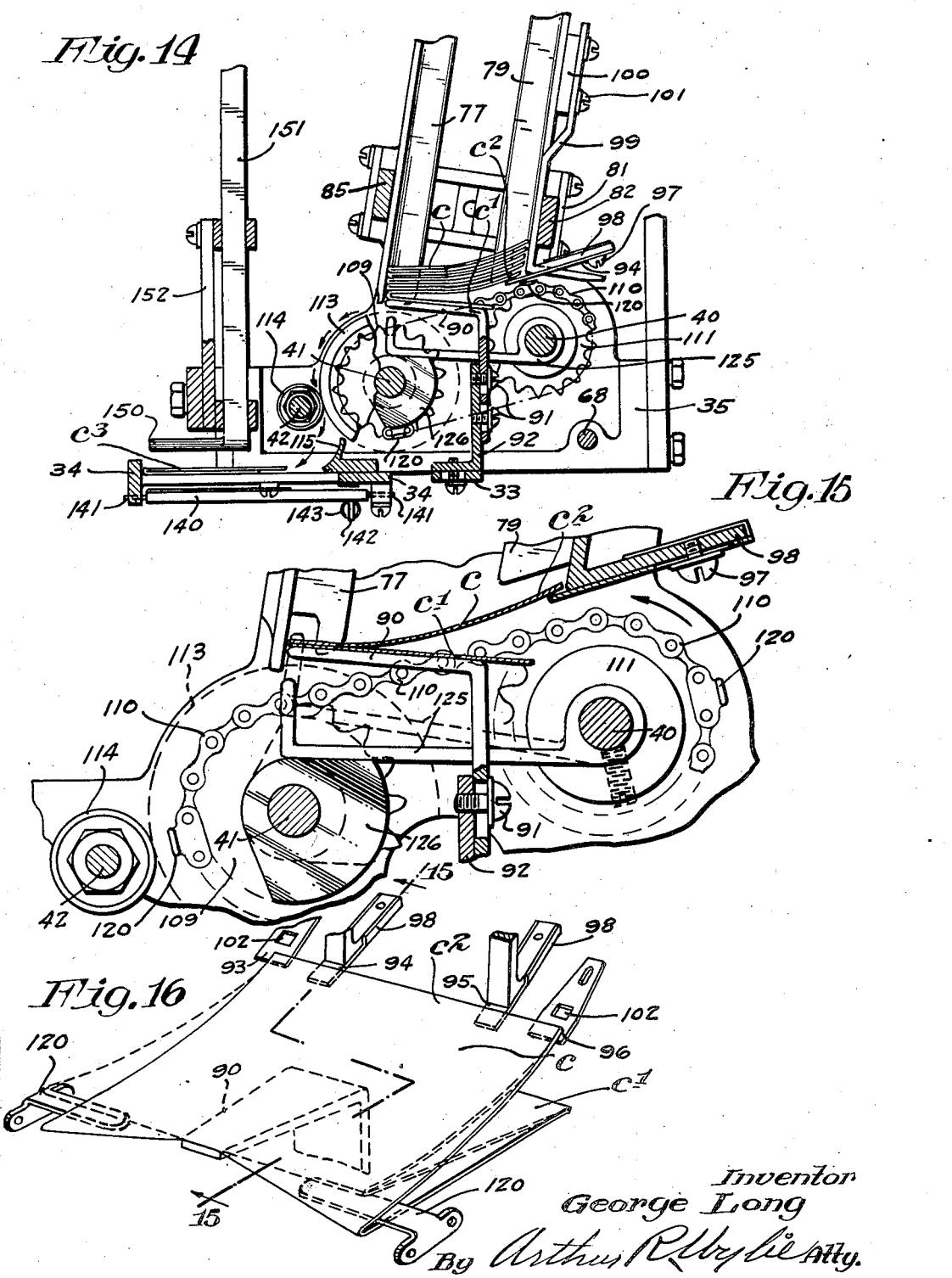

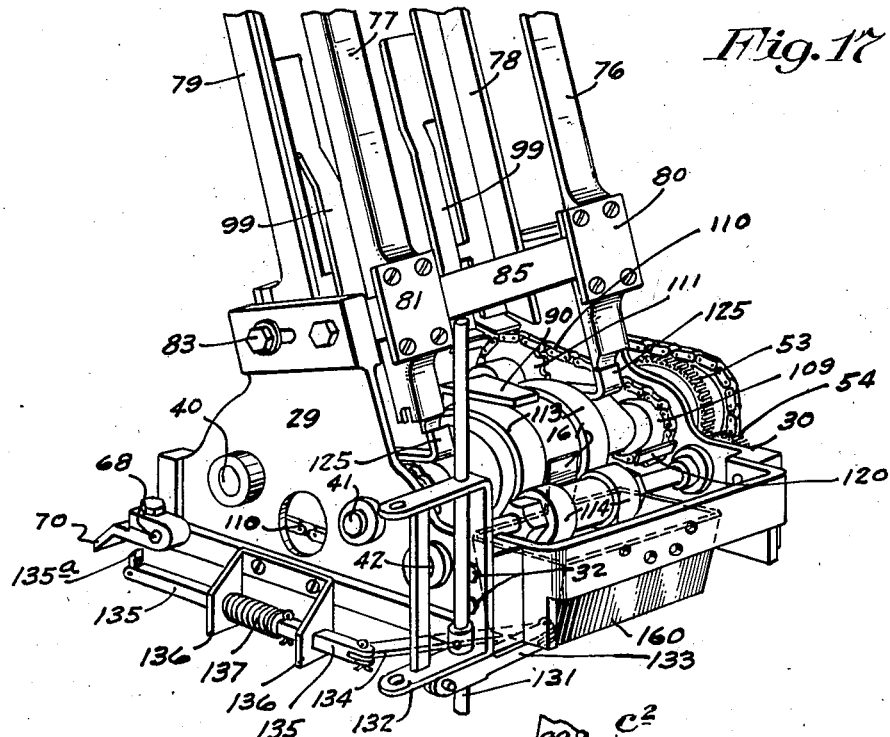
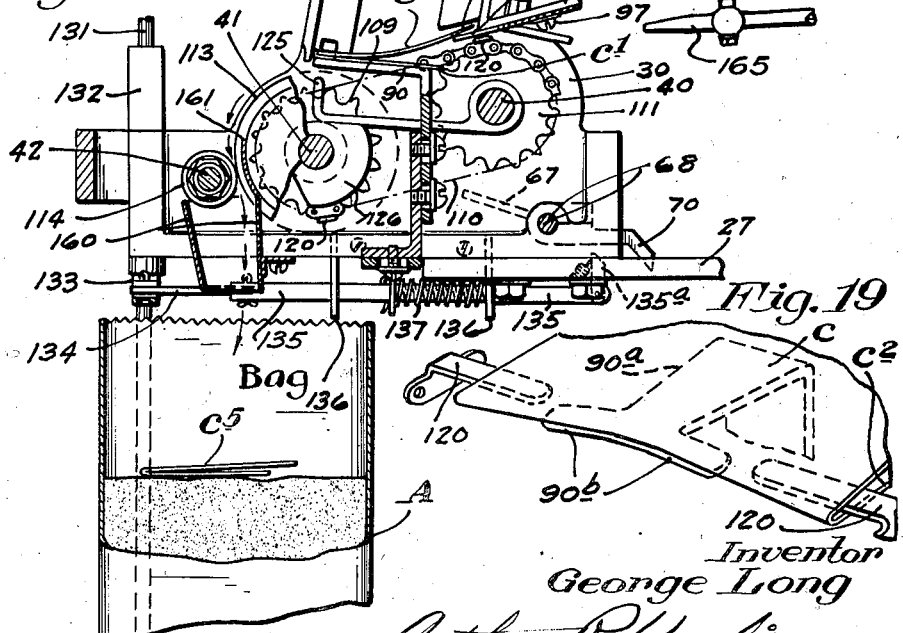

Patented Oct. 19, 1943

2,332,156

UNITED STATES PATENT OFFICE 2,332,156

COUPON FEEDER

George Long, St. Louis Park, Minn., assignor to General Mills, Inc., a corporation of Delaware Application December 1, 1941, Serial No. 421,187

7 Claims. (Cl. 226—2)

This invention relates to devices for feeding coupons, advertising inserts, folders, etc. to bags or cartons containing flour, breakfast foods or the like.

An object of this invention is to provide an improved coupon feeder which will efficiently feed coupons to the open mouths of bags, cartons and other containers.

Another object is the provision of means for forcing the coupon down into the material in the bag.

These and other objects, as will hereinafter appear, are accomplished by this invention which is fully described in the following specification and shown in the accompanying drawings in which Figure 1 is a perspective view of one form of the coupon feeder by which the coupon is immersed in the material in a bag or container;

Fig. 2 is a partial perspective view of a bracket for supporting the coupon feeder of Fig. 1;

Figs. 3 and 3a are perspective views of one form of the folded coupon of a type intended to be fed;

Fig. 3b is an enlarged end view of the same to show the various folds of paper making up the coupon;

Fig. 4 is a partial perspective view of the lower end of the chute showing part of the mechanism of the coupon feeder;

Figs. 5 and 6 are perspective views of details of the same;

Fig. 7 is a partial perspective view of the coupon feeder from the opposite side to that of Fig. 1;

Figure 13:
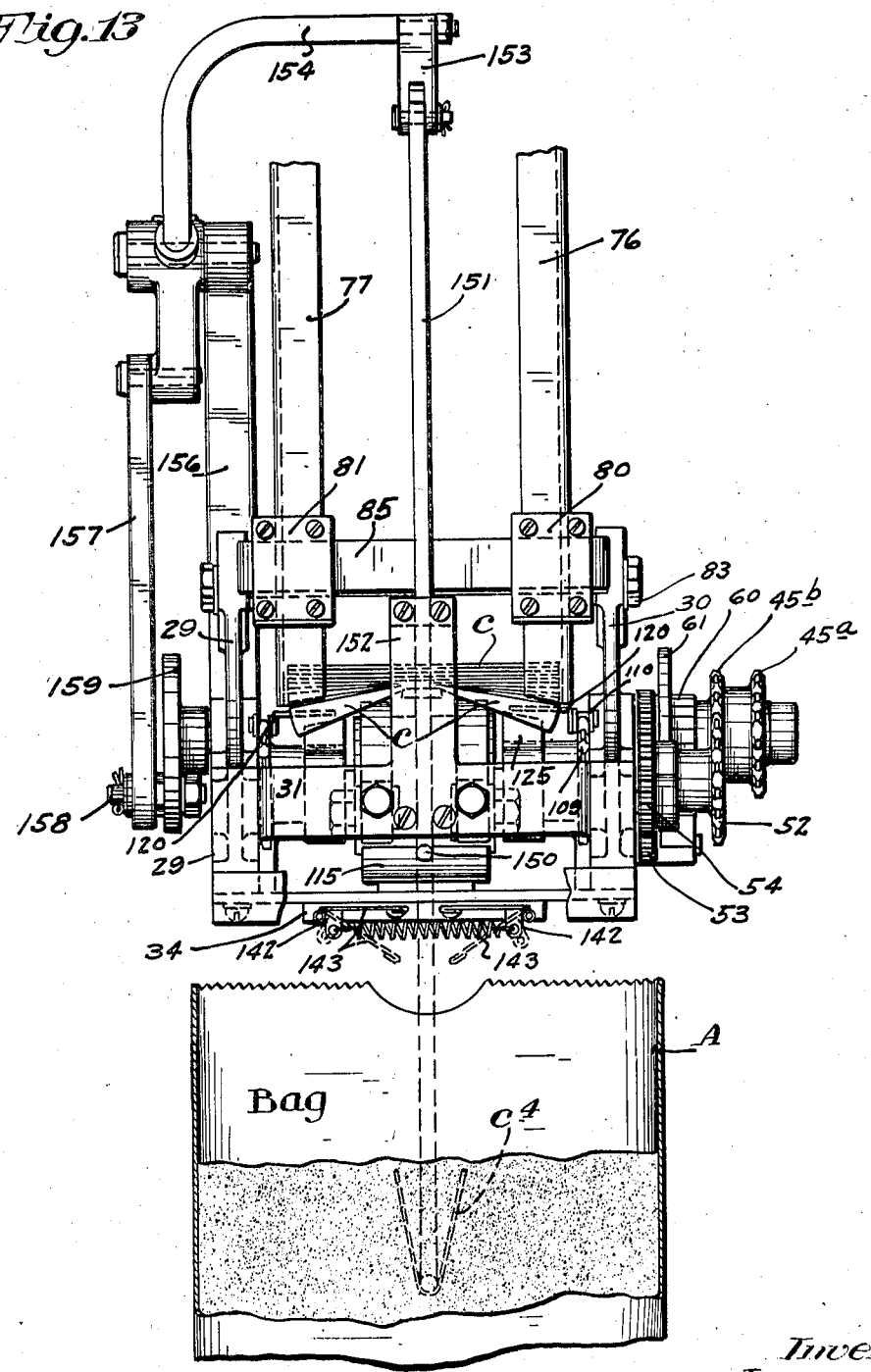

Figs. 7a and 7b are details on the lines 7a and 7b of Fig. 7;

Fig. 8 is a horizontal section taken on the line 8—8 of Fig. 12;

Figs. 9, 10 and 11 are partial vertical sections on the line 9—9, 10—10 and 11—11 of Fig. 8;

Fig. 12 is a side elevation of the coupon feeder showing the support and parts of the mechanism broken away;

Fig. 13 is a front elevation of the same;

Fig. 14 is a partial vertical section on the line 14—14 of Fig. 8 showing the supports for the stack of coupons and the mechanism for removing the lower coupon from the stack;

Fig. 15 is a partial section taken on the broken line 15—15 of Fig. 16;

Fig. 16 is a diagrammatic view showing the lowermost coupon together with its means of support and the fingers for removing it;

Fig. 17 is a partial perspective view similar to Fig. 7 but with some of the parts removed for greater clearness and showing a modified form of the invention in which the coupon is merely dropped into the container;

Fig. 18 is a partial vertical section through the mechanism of Fig. 17; and

Fig. 19 is a view similar to Fig. 16 showing a modification of the central foot.

The embodiment illustrated in Figs. 1 to 16, inclusive, comprises a self-contained and portable coupon feeder having a standard 20 supported on legs 21 to which may be added adjusting screws 22 for leveling it on any uneven floor. It is particularly adapted to be placed adjacent a belt conveyor 23 which is continuously driven by any suitable source of power, not shown, and which is adapted to carry bags A of flour, meal, cereal breakfast food and the like and into which it is desired that the coupon may be inserted or dropped.

On the standard 20 is adjustably secured an arm 26 to which is secured a motor bracket 27 as by means of a screw 28.

The bracket 27 is secured to a feeder frame made up of spaced side frame members 29, 30 secured together with cross members such as the front tie 31 held by screws 32 and such as the tie 33 (Fig. 10), the gate frame 34 (Fig. 9) and front and rear rail ties which will later be described. The feeder frame is provided with bearings in which are journalled shafts 40, 41 and 42. The shaft 40 has a double sprocket 45 journalled thereon, the sprocket 45ª being driven by a sprocket 46 on the shaft 47 of a gear reducer 48 (Fig. 12) which in turn is driven by an electric motor 49 (Fig. 1).

The sprocket 45ᵇ which is also continuously driven through a chain drives a sprocket 52 which is keyed on the shaft 41. This shaft also has a gear 53 keyed thereon which meshes with a gear 54 keyed on the shaft 42. Thus it will be seen that the shafts 41 and 42 are continuously driven while the shaft 40 is intermittently driven. The mechanism for driving it will now be described.

On the hub of the double sprocket 45 is formed a ratchet 60. A plate 61 is keyed to the shaft 40 (Fig. 10) and lies adjacent the sprocket and carries a pawl 62 which is pivotally mounted on a shoulder screw 63. A spring 64 is attached at one end to a pin 65 and at the other end to the outer end of the pawl 62.

This pawl has a shoulder 66 which protrudes beyond the periphery of the circular plate 61 and is adapted to be engaged by a detent 67 secured to a rocker shaft 68 which is journalled in the feeder frame 35. A spring 69 normally holds the detent 67 in engagement with the periphery of the circular plate 61 so that as the shaft 40 rotates in counter-clockwise direction, as shown in Fig. 11, the detent will engage the shoulder 66 thereby disengaging the pawl 62 from the ratchet and moving it outwardly until it strikes a stop 62a, bringing the shaft 40 to a standstill.

For releasing the detent from the shoulder 66, I have provided an arm with a sloping outer surface 70 (Fig. 12) which is actuated as will later be described to raise the lever having the outer surface 70 thereby lowering the detent 67 so that the pawl will engage the ratchet so as to enable the plate 61 to make one revolution after which the shoulder 66 is again caught by the detent 67. At the same time, the shaft 40 thus makes one revolution for the purpose of feeding forward one coupon, as will later be described.

The chute for holding a stack of coupons will now be described. It consists essentially of two forward fixed angle members 76, 77 which are secured at their bottoms to the side frame 35 and adjustable angle members 78, 79 (Fig. 1) which is secured as by means of plates 80, 81 to a rear rail tie 82 which has U-shaped ends which in turn are adjustably secured to the side frame by means of adjusting bolts 83 placed in slots 84. The forward angle members 76, 77 are likewise mounted for lateral adjustment on a front rail tie 85 of U-shape which is secured to the side frame members by screws 86. This permits the chute to be adjusted both for width and for depth to accommodate coupons of different sizes. It will be understood, however, that coupons of a single size only are fed through the chute for any given adjustment.

The upper ends of these members forming the chute may, if desired, be cross-braced and adjustably secured in any desired manner. No such cross-bracing, however, is shown in the present installation for the sake of simplicity and clarity.

Referring now to Figs. 14 to 16, a central foot 90 is adjustably secured by means of screws 91 to a cross bar 92 secured to the side frames and serves to support the center of the stack of coupons C. It is preferably slightly sloped to the rear as shown in Fig. 15 while the shafts 40, 41 are preferably sharply inclined to the left. Each coupon C as shown in Fig. 15 consists of a lower flap $c^1$, which is preferably closed at its edge or returned on itself as shown so as not to present a space into which the picker fingers could enter, and an upper flap $c^2$ which overlaps the lower flap so that the rear edge of the upper flap may be caught and retained by means of inclined ledges 93, 94, 95 and 96 as shown in Fig. 16, while the forward edge is supported on the central foot 90 and is guided and retained at the forward corners by the angle members 76, 77.

Ledges 94 and 95 are adjustably secured by means of screws 97 to the rearwardly and upwardly inclined lower ends 98 of members 99 which are secured to lugs 100 on the rear of the angle members 78, 79 by means of screws 101 (Fig. 14).

The ledges 93, 96 have central openings 102 which permit them to pass over projections 103 (Fig. 4) secured to the bottoms of the angle members 78, 79 to which they are secured by means of screws 104.

The mechanism for removing the lowermost coupon from the stack and for urging it forward will now be described.

Referring to Figs. 8 to 12, the shaft 41 is provided with two idler sprockets 109 which are journalled freely thereon. These sprockets have rotation independent of the shaft 41 since they are driven by chains 110 and sprockets 111 secured on the shaft 40 by means of set screws. The drum 112 is keyed on the shaft 41 and it carries two rubber bands or faces 113 which engage rubber bands 114 secured on the shaft 42. The frame 34 (Fig. 14) carries an arcuate guard 115 which lies beneath the line of contact between the rubber bands 113 and 114 so as to guide the movement of a coupon fed through between these several bands or wheels. The lowermost coupon is thus fed forward and is caught and held in the position $c^3$, as shown in Fig. 14. The mechanism for catching the coupon and for further feeding it into a filled bag will later be described.

It will be seen that the chains 110 lie on opposite sides of the stack of coupons, as shown in Fig. 9. Each chain carries an inwardly projecting picker finger 120. These picker fingers are normally in the neutral position shown in Fig. 15. The parts are so proportioned that one revolution of the shaft 40 will cause each picker finger to advance to the position now occupied by the other. As it does so, the picker finger passes in between the lower flap $c^1$ and the upper flap $c^2$, as shown in Fig. 14. As it does so and as it approaches the bend between these two flaps, the outer ends of the lowermost coupon are drawn down bending the coupon C over the central foot 90 as shown in Fig. 9, thereby drawing the outer forward corners of the coupon beneath the lower ends of the angle members 76, 77. The picker fingers then continue to advance, carrying the coupon with them, thereby carrying the coupon around the rubber faced wheels 113 and carrying the coupon between the rubber faced wheels 113 and 114. Since the picker fingers stop on the line of tangency of rubber faced wheels 113 and 114, the continuous rotative action of these wheels propel the coupon onward disengaging it from the picker fingers.

Before the coupon is fed forward, the forward corners of the stack of coupons is jogged to cause them to feed down uniformly and raised to straighten the forward end of the lowermost coupon, thereby permitting the lower flap to bend readily in about a transverse axis because only one center support is used at the front of the coupon, the left and right sides of the coupon sag down under a full magazine load. In this condition the lower flap $c^1$ cannot bend transversely and drop down. Members 125 serve to raise the sagging sides to straighten the coupon, permitting the flap $c^1$ to bend and drop so as to receive the picker fingers. The jogger members 125 which are hingedly mounted on the shaft 40, as shown in Fig. 15, and at their forward end rest upon a cam 126 secured to idler sprockets 109. Thus, as this cam rotates in timed relation with sprocket 109 and fingers 120 in counter-clockwise direction, the cam lifts the member 125 from the full line position to the dotted line position, thereby slightly lifting the forward edge of the stack of coupons off the central foot 90 and as it is withdrawn, permitting them to fall back on this central foot. Each rotation of the shaft 40 causes a half rotation of the chain and advances the picker fingers from one stationary position to the next as shown in Fig. 15.

The tripping of the pawl 62 (Fig. 11) which connects the plate 61 with the continuously driven shaft 40 is accomplished by the passage of a bag beneath the mechanism, as shown in Fig. 7. As the bag moves forward, it encounters a trip lever 130 mounted on the shaft 131 which is hingedly mounted in a U-shaped member 132 secured to the side frame 29. This shaft as more clearly shown in Fig. 7b carries a lever arm 133 which has a link 134 pivotally connected to a thrust member 135 which is slidably mounted in guides 136 secured to side frame 29. A spring 137 normally holds the parts of the thrust member in the position shown. The outer end of the thrust member 135, as shown in Fig. 7a, carries a pivoted ear 135$^a$ yieldably pressed by a spring 135$^b$ and which has an inclined forward surface adapted to engage the inclined end of the lever 70.

Thus it will be seen that when a bag on the conveyor strikes the lever 130, the ear 135$^a$ will be moved forward, engaging and raising the lever 70 on the shaft 68 (Fig. 11), thereby withdrawing the detent 67 and permitting the pawl 62 to engage a tooth on the ratchet 60, thereby causing the plate 61 to make one complete revolution when it is again brought to rest by means of the detent 67. On the return stroke, the spring 135$^b$ yields to permit the ear 135$^a$ to pass.

The mechanism for catching the coupon and for plunging it into the bag will now be described. This consists of the frame 34 which is secured to the bottom of the side frames and has two normally horizontal wings 140 having pivots 141 pivotally secured in this frame. Each wing has a depending lug 142 with a tension spring 143 extending from one lug to another so as to normally hold them in horizontal position to receive a coupon $c^3$.

A plunger 150 normally lies above the coupon $c^3$, as shown in Fig. 13, and has a vertically extending rod 151 which is provided with suitable guides 152 secured to the front tie 31. This rod connects through a link 153 with a lever arm 154, the lever arm being pivotally connected at 155 (Fig. 12) to a standard 156. The opposite end of this lever is preferably counter-weighted and connects through a link 157 with a pin 158 on a crank 159 secured on the end of the shaft 40.

Thus it will be seen that on each revolution of the shaft 40, the plunger 150 will move down from the full line position of Fig. 13 to the dotted line position, carrying with it a coupon to the position $c^4$ in which that coupon is immersed in the flour or other material in the bag.

I have thus provided a simple and efficient means for feeding coupons of the type described to containers having therein flour, meals, breakfast cereals and the like.

In Figs. 17 and 18 is shown a modified form of the device in which the plunger for immersing the coupon is omitted together with the mechanism for catching the coupon. In this form a spout or guides 160 are provided which direct the coupon $c^5$ into the bag and on top of the material. A finger 161 extends upwardly from the spout between the spaced rubber bands 113, 114 to insure stripping the coupon from the rolls. The mechanism is substantially otherwise the same as that previously described, omitting, however, the gate frame 34 and its associated parts as well as the plunger 150 and parts for operating the same.

The sprockets 111 are adjustably secured on the shaft 40 by means of set screws in order that the picker fingers 120 may stop at the proper position with relation to the rubber faced wheels 113, 114. This position, as shown in Fig. 15, is one in which the forward edge of the coupon is caught between the rubber faced wheels and the forward edges of the fingers 120 have just passed the line between the axes of the shafts 41, 42.

In Fig. 19 is shown a modification of the central foot of Fig. 16 in which the foot 90$^a$ is provided with two lateral ears 90$^b$ to serve as additional supports where needed for holding very flexible coupons, for example, those made from light stock or those having a single fold.

In Fig. 18 is shown an air jet 165 controlled by a valve 166 and connected to a suitable source of air pressure such as an air tank not shown. This jet serves to direct a small current of air beneath the coupon C so as to insure that the lower flap $c^1$ will drop to receive the picker fingers.

While I have shown and described but a few embodiments of my invention, it is to be understood that it is capable of many modifications. Changes, therefore, may be made which do not depart from the spirit and scope of the invention as disclosed in the appended claims.

I claim as my invention:

1. In a machine for withdrawing coupons from the bottom of a pile and inserting them into a bag, said coupons being folded so as to leave the lowermost flap shorter than the flap above it, guides for enclosing a stack of such coupons, means for supporting the forward edge of the lowermost flap of the lowermost coupon, means for supporting the rear edge of the flap above, picker fingers for sliding the lowermost coupon from the pile including inwardly extending fingers adapted to pass between said flaps and to engage the forward corners of the coupon where the fold occurs, means for removing the coupon from said fingers after it is removed from the pile, and means operable by a filled bag for intermittently driving the picker fingers.

2. In a machine for withdrawing coupons from the bottom of a pile and inserting them into a bag, said coupons being folded so as to leave the lowermost flap shorter than the flap above it, guides for enclosing a stack of such coupons, means for supporting the center of the forward edge of the lowermost flap of the lowermost coupon, means for supporting the rear edge of the flap above, means for sliding the lowermost coupon from the pile including inwardly extending fingers adapted to pass between said flaps and to engage the forward corners of the coupon where the fold occurs, the fingers moving the forward corners of the coupon forwardly and downwardly so as to bend it over the central supporting means, means for removing the coupon from said fingers after it is removed from the pile, and means operable by a filled bag for intermittently driving the picker fingers.

3. In a machine for withdrawing coupons from the bottom of a pile and inserting them into a bag, said coupons being folded so as to leave the lowermost flap shorter than the flap above it, guides for enclosing a stack of such coupons, means for supporting the stack, means for sliding the lowermost coupon from the pile including inwardly extending definitely spaced picker fingers adapted to pass between said flaps and to engage the forward corners of the coupon where the fold occurs, means for driving said fingers, and rubber faced wheels for removing the coupon from said fingers after it is removed from the pile.

4. In a machine for withdrawing coupons from the bottom of a pile and inserting them into a bag, said coupons being folded so as to leave the lowermost flap shorter than the flap above it, guides for enclosing a stack of such coupons, means for yieldingly supporting the center of the forward edge of the lowermost flap of the lowermost coupon but leaving the forward corners unsupported, means for supporting the rear corners of the flap above, two spaced chains movable beneath the pile, spaced inwardly projecting fingers carried by the chains and adapted to pass between said flaps to cause said fingers to engage the crotches at the forward corners of the coupon for sliding the lowermost coupon from the pile, and means for removing the coupon from said fingers after it is removed from the pile.

5. In a machine for withdrawing coupons from the bottom of a pile and inserting them into a bag, said coupons being folded so as to leave the lowermost flap shorter than the flap above it, guides for enclosing a stack of such coupons, means for yieldingly supporting the center of the forward edge of the lowermost flap of the lowermost coupon, means for supporting the rear corners of the flap above, two spaced members movable beneath the pile, inwardly projecting fingers carried by said members arranged in aligned facing pairs, one at each side of the coupons and adapted to pass between said flaps to cause said fingers to engage the crotches at the forward corners of the coupon for sliding the lowermost coupon from the pile, and means for removing the coupon from said fingers after it is removed from the pile.

6. An inserter for coupons having a folded forward edge, picker fingers for withdrawing a coupon from a stack, rolls between which the coupon is fed by the picker fingers, means for stopping the picker fingers soon after reaching the point where the coupon is caught by the rolls, and means for intermittently driving the picker fingers.

7. In a coupon feeder, means for supporting a stack of coupons which are folded so as to leave the lowermost flap shorter than the flap above it so that the rear edge of the lowermost flap drops some distance below the upper flap and forms crotches at the forward corners of the coupon, picker fingers adapted to pass between the upper and lower flaps and travel forwardly so as to engage the coupon in said crotches, the supporting means including a foot for supporting the center of the forward edge of the coupon, retaining means forming part of the supporting means and lying in front of the lowermost coupon for normally retaining its forward corners, and means for driving said fingers so as to engage said crotches and to bend the forward corners of said coupon down below the level of the retaining means so as to cause the lowermost coupon to pass thereunder while it is being withdrawn from the stack.

GEORGE LONG.